United States Patent [19]
Field et al.

[11] Patent Number: 5,475,189
[45] Date of Patent: Dec. 12, 1995

[54] CONDITION RESPONSIVE MUFFLER FOR REFRIGERANT COMPRESSORS

[75] Inventors: Michael G. Field, Fabius; Erric L. Heitmann, Liverpool; Thomas S. Katra, Fayetteville, all of N.Y.

[73] Assignee: Carrier Corporation, Syracuse, N.Y.

[21] Appl. No.: 976,763

[22] Filed: Nov. 16, 1992

[51] Int. Cl.⁶ .................................................. F01N 7/18
[52] U.S. Cl. ........................ 181/241; 181/229; 181/403
[58] Field of Search .................................. 181/206, 211, 181/216, 219, 226, 229, 241, 255, 277, 282, 269, 272, 403

[56] References Cited

U.S. PATENT DOCUMENTS

| | | | |
|---|---|---|---|
| 2,514,344 | 7/1950 | Slaymaker et al. | 181/277 |
| 3,141,519 | 7/1964 | Bottum | 181/226 |
| 3,219,141 | 11/1965 | Williamitis | 181/226 |
| 3,750,840 | 8/1973 | Holme | 181/241 |
| 4,537,279 | 8/1985 | Van Heekeren | 181/277 |

FOREIGN PATENT DOCUMENTS 0051910  4/1980  Japan ................................. 181/241

*Primary Examiner*—Khanh Dang

[57] ABSTRACT

Pulses are sensed at the inlet and outlet of a two-chamber reflective muffler and responsive thereto the cavities are tuned to the frequency of the pulses. Specifically, chamber walls are moved to have them located at spacings corresponding, respectively, to one half and one quarter of the wavelength of the pulses.

10 Claims, 1 Drawing Sheet

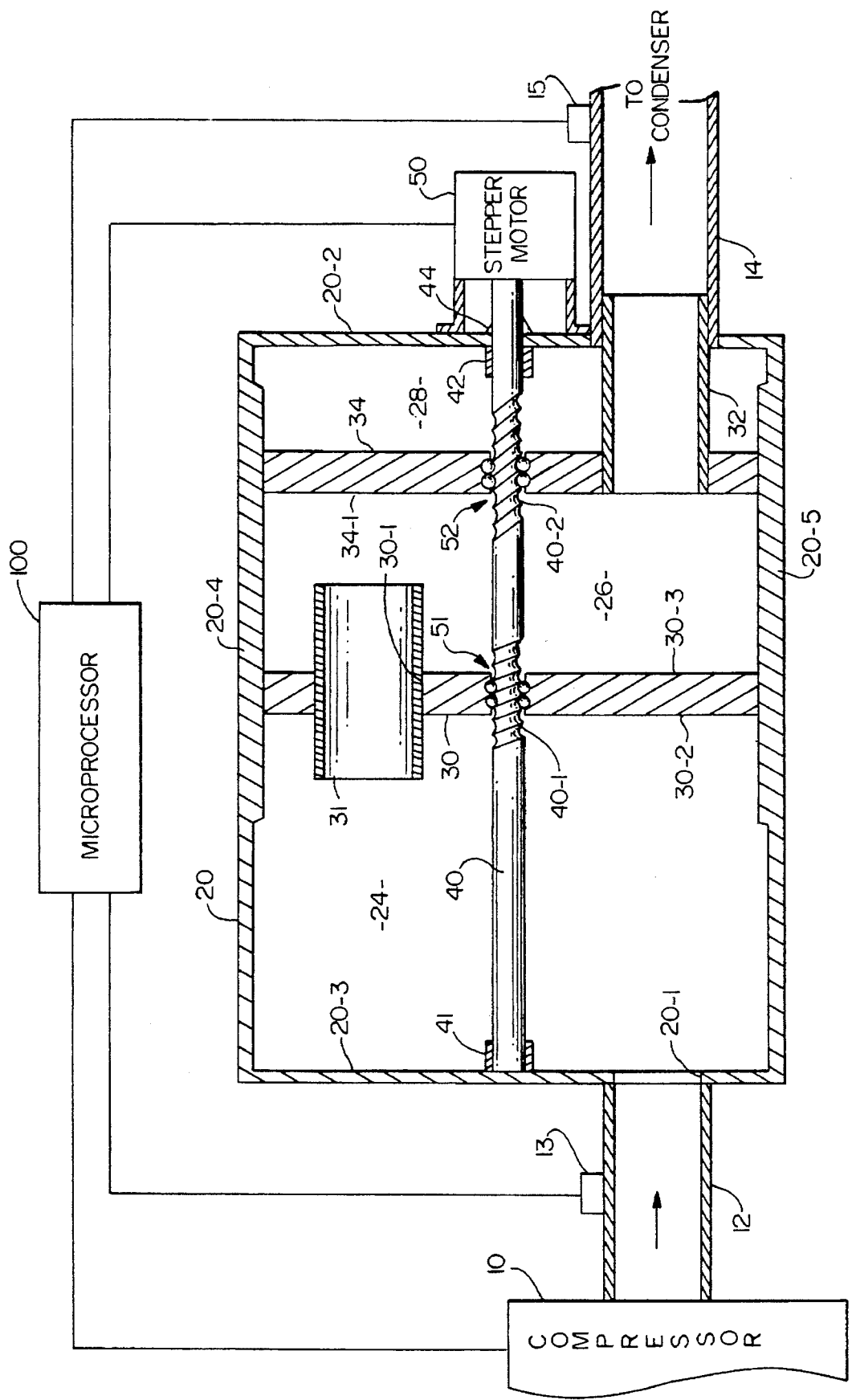

5,475,189

CONDITION RESPONSIVE MUFFLER FOR REFRIGERANT COMPRESSORS

BACKGROUND OF THE INVENTION

A positive displacement compressor takes in gas, compresses and thereby heats the gas and discharges the heated, pressurized gas in a pulsed discharge. The noise associated with a pulsed discharge is normally attenuated by a muffler. Because the speed of sound is dependent upon the temperature, the amount of entrained oil, and density of the medium through which it is traveling, in the case of a refrigerant compressor, ambient temperature and system loading will influence the speed of sound in the discharge gas. Further, variable speed operation will change the frequency of the pulses and unloading may decrease the discharge pressure and may produce changes in the discharge temperature depending upon the nature of the unloading. Because of the inherent fluctuation in temperature, density and pressure of the discharged gas and the frequency of the discharge pulses, a muffler would normally be acting on the gas at off-design conditions. Accordingly, the sound attenuation is normally less than that achieved at design conditions.

Reactive mufflers are called reactive not because they "react", but because their acoustic impedance is primarily reactive, as opposed to dissipative, that is, they absorb very little energy; instead, they work by reflecting the acoustic energy back toward the source. The electrical analogy is a filter circuit, which passes some frequencies and blocks others. Ideally, it is desirable to have a muffler which passes a frequency of zero (the steady flow) and blocks all other frequencies 100%. The problem is, this would require an infinitely large muffler with an infinite number of elements; thus, such a muffler would be impractical for size reasons as well as because of the cost.

As a result, one normally picks some reasonable number of elements and chooses their dimensions as a best compromise, considering the frequencies that are present to be attenuated (blocked). This solution always has certain "pass bands", i.e., frequencies ranges where energy is passed essentially unattenuated. The design skill is to pick the dimensions so these pass bands are at frequencies where the source machine has little or no energy generated.

Specifically, in HVAC positive displacement compression systems, there has traditionally been one advantage and one disadvantage compared to, say, internal combustion engine mufflers which are most commonly described in the literature. The advantage is that the compressors have been essentially constant speed, so the frequencies to be attenuated do not change much; the disadvantage is that most refrigerants are very dense and somewhat viscous at discharge conditions, so that any restrictions tend to cause large pressure drops and attendant losses in system efficiency. The compromise that has evolved is, typically, a 2 or 3 chamber muffler with re-entrant interconnecting tube(s).

The problem with this traditional approach on screw compressors as they are developing today (and to a lesser extent, other compressor technologies) is twofold: the machines will be applied variable speed, so the frequencies will vary over a broad range; and, they have a large and somewhat variable oil concentration, which changes the speed of sound in the discharge gas (having the same effect as a frequency change vis-a-vis muffler design). Trying to meet this challenge in muffler design traditionally leads to an excessively elaborate muffler with unacceptable pressure drop (i.e., efficiency loss).

SUMMARY OF THE INVENTION

The present invention addresses this problem associated with variable speed operation by using a straightforward "traditional muffler" with added hardware and logic to make key dimensions "adaptive". The theory is to sense the pressure pulsations entering and leaving the muffler, and with an appropriate algorithm, adjust dimensions dynamically to minimize the pulsations leaving the muffler at desired frequency(ies).

Specifically, the muffler has two cavities with the cavity on the inlet side being twice the length of the cavity on the discharge side. The ported wall between the two cavities is movable as is the discharge side wall of the discharge side cavity. The two movable walls are generally commonly driven with the wall between the two cavities being moved at two thirds the rate of the discharge side wall so as to maintain the length ratios of the two cavities at, nominally, 2:1. A first sensor is located at or near the inlet to the muffler and a second sensor is located at or near the discharge side of the muffler. The sensors are tied through a microprocessor to the actuator for driving the two walls. The two sensors respectively monitor the discharge pressure pulsations entering and leaving the muffler and, responsive to the sensed pulsations, the two walls are moved so as to have respective cavity lengths of one half and one quarter wavelength of the discharge pulsations. Although, the lengths of the two chambers are varied with a fixed length ratio (in this case nominally 2 to 1, which is a good general strategy), it is important to recognize that some other ratio may be better for a given source characteristic. Additionally, it should be noted that the re-entrant interconnecting tube is not being tuned so that a ratio of, for example, 1.9 to 1 may be best in actual practice. Also, the lengths could be varied independently with theoretically better results, at the expense of greater mechanical complexity and more complicated logic in the control algorithm.

It is an object of this invention to provide a condition responsive muffler.

It is another object of this invention to tune a muffler responsive to operating conditions. These objects, and others as will become apparent hereinafter, are accomplished by the present invention.

Basically, the flow path through a muffler serially includes two chambers with the upstream chamber having a length twice that of the downstream chamber. The lengths of the chambers are adjusted responsive to sensed inlet and outlet pulsations so as to tune the two chambers to a half wavelength and a quarter wavelength, respectively.

BRIEF DESCRIPTION OF THE DRAWING

For a fuller understanding of the present invention, reference should now be made to the following detailed description thereof taken in conjunction with the accompanying drawing wherein.

The FIG. is a sectional view of the muffler of the present invention employed in a refrigeration or air conditioning system.

DESCRIPTION OF THE PREFERRED EMBODIMENT

In the FIG., the numeral 10 generally designates a compressor which may be any positive displacement compressor. Compressor 10 is in an air conditioning or refrigeration system and is under the control of microprocessor 100 responsive to a plurality of inputs such as thermostat settings, zone temperatures, ventilation requirements, etc. The pulsed output of compressor 10 is supplied via discharge line 12 to muffler 20 from which it passes via outlet line 14 to the condenser (not illustrated) of a refrigeration system. In passing through muffler 20, the flow serially goes through discharge line 12, port 20-1, chamber 24, re-entrant tube 31, chamber 26, sleeve 32 and outlet line 14.

Generally circular partition 30 separates chamber 24 from chamber 26 with re-entrant tube 31 located in bore 30-1 providing fluid communication therebetween. Generally circular partition 34 carries sleeve 32 and separates chamber 26 from dead space 28. Shaft 40 is supported by bearings 41 and 42 and is sealed by seal 44 where shaft 40 extends through wall 20-2 of muffler 20. Shaft 40 is driven by stepper motor 50 and has threads 40-1 and 40-2 of ball screws 51 and 52, respectively, with threads 40-1 having two thirds the pitch of threads 40-2. Sensors 13 and 15 are located so as to sense discharge pulses entering and leaving muffler 20 and are shown as located on compressor discharge line 12 and outlet line 14, respectively.

In operation, compressor 10 is operated under the control of microprocessor 100 responsive to a plurality of inputs such as zone temperatures and setpoints, as is conventional. Additionally, microprocessor 100 receives inputs from sensors 13 and 15 indicative of discharge pressure pulsations in lines 12 and 14, respectively. Responsive to the discharge pressure pulsations sensed by sensors 13 and 15, microprocessor 100 controls stepper motor 50 to achieve the greatest sound reduction in muffler 20. Specifically, sensor 13 senses the pulsed discharge of compressor 10 which passes via discharge line 12 and port 20-1 into chamber 24 which acts as a reflective chamber whereby the discharge pulses reflect back and forth between surface 30-2 of partition 30 and wall 20-3 of muffler 20 before passing via re-entrant tube 31 into chamber 26. Similarly, pulses from chamber 24 passing through re-entrant tube 31 into chamber 26 will be reflected back and forth between surface 30-3 of partition 30 and surface 34-1 of partition 34 before passing via sleeve 32 into outlet line 14.

Recognizing that the frequency content entering and leaving the muffler 20 will in general be the same (this can be shown theoretically by a Fourier series analysis); therefore, one has to focus on some variable other than the "number of pulses" entering and leaving. The two obvious choices are amplitude and phase. In principle, one could sense pulsation amplitude leaving the muffler (at sensor 15) and adjust the muffler to minimize the amplitude. In general, however, the tendency will be to find a local minima, since the response curves can be relatively complex, especially if a rapid change occurs. It will greatly improve the reliability of the optimization by considering phase also. This requires both sensors (13 and 15), since phase is a difference between two signals. The advantage is that the phase response tends to be more well behaved than the amplitude response. Therefore, a desired phase angle region can be predefined in the microprocessor memory, and the muffler adjusted via the stepper motor 50 until the angle is in this region; a minimization algorithm may be applied to the amplitude at sensor 15, to assure that the truly optimum adjustment is achieved.

To minimize the intensity of the pulses exiting muffler 20, it is thus necessary to tune the muffler. To meet the chamber spacing requirements, the distance between wall 20-3 and surface 30-2 is to be maintained at a half wavelength while the distance between surfaces 30-3 and 34-1 is to be maintained at a quarter wavelength.

Responsive to the threshold difference in pulses sensed by sensors 13 and 15, microprocessor 100 actuates stepper motor 50 to rotate shaft 40 a predetermined amount. The rotation of shaft 40 causes a coaction with ball screw 51 via threads 40-1 and with ball screw 52 via threads 40-2 causing the movement of partitions 30 and 34. Partitions 30 and 34 have slots coacting with keys 20-4 and 20-5 which prevents their rotation with shaft 40. Because the pitch of threads 40-1 is two thirds that of threads 40-2, the distance between wall 20-3 and surface 30-2 is always twice the distance between surfaces 30-3 and 34-1. Allowing for the stepping increments of stepper motor 50, incremented changes in discharge density, temperature, compressor capacity/pulsations, the present invention will track these conditions to maintain the tuning of muffler 20 with resultant sound reduction as compared to a muffler tuned only to a design condition.

Although a preferred embodiment of the present invention has been illustrated and described, other changes will occur to those skilled in the art. For example, the cavity dimensions may be changed to multiples of the frequency to accommodate higher frequency discharge pulsations of high speed compressors and the number of cavities can be increased. Additionally, rather than having partition 30 form a common separation between chambers 24 and 26 so that its movement always enlarges one chamber while reducing the other chamber, it can coact with a fixed partition. Specifically, a fixed partition will be located between movable partitions 30 and 34 and will coact with partition 34 to form chamber 26. A dead space, such as 28, will exist between partition 30 and the fixed partition and fluid communication between the chambers will be via a sleeve such as 32. Also, the cavities can be individually tuned by using separate stepper motors and drive mechanisms for each. In this configuration, the pitch of threads 40-1 will be twice that of threads 40-2. It is, therefore, intended that the present invention is to be limited only by the scope of the appended claims.

What is claimed is:

1. A condition responsive muffler for positive displacement fluid machines comprising:

a casing means having an inlet and an outlet and having a flow path between said inlet and said outlet serially including a first and a second chamber;

first movable partition means in said casing means;

second movable partition means in said casing means;

said first movable partition means coacting with said casing means to define said first chamber;

said second movable partition means coacting with said casing means to define said second chamber;

said first and second chambers having a predetermined ratio of lengths;

means for moving said first and second movable partition means so as to maintain said predetermined ratio while tuning said muffler.

2. The muffler of claim 1 wherein said ratio is nominally 2:1.

3. The muffler of claim 1 further including means for sensing flow pulses entering said inlet and leaving said outlet and means for operating said means for moving responsive to said sensed pulses.

4. The muffler of claim 3 wherein said means for sensing senses phase and amplitude of said sensed pulses.

5. The muffler of claim 1 wherein said first movable partition means forms a portion of said first and second chambers.

6. A condition responsive muffler comprising:

casing means having an inlet adapted to be connected to a source of pulsations produced by pulsed flow, and an outlet;

a flow path between said inlet and said outlet and serially including a first chamber and a second chamber;

first movable partition means in said casing means between said first and second chambers;

second movable partition means spaced from said first movable partition means and coacting with said casing means to define said second chamber;

said first and said second chambers in said casing means having a predetermined ratio of lengths;

means for sensing pulses supplied to said inlet;

means for sensing pulses passing from said outlet;

means responsive to said means for sensing pulses supplied to said inlet and pulses passing from said outlet to move said first and second movable partition means to maintain said predetermined ratio while tuning said muffler.

7. The muffler of claim 6 wherein said means responsive to said means for sensing pulses includes a microprocessor and motor means.

8. The muffler of claim 6 wherein said first movable partition means forms a portion of said first and second chambers.

9. The muffler of claim 6 wherein said means for sensing pulses supplied to said inlet and passing from said outlet senses phase and amplitude.

10. A condition responsive muffler comprising:

casing means having an inlet and an outlet and having a flow path between said inlet and said outlet serially including a first and a second chamber;

means for tuning said first and second chambers responsive to flow pulses entering said inlet and leaving said outlet wherein said means for tuning include means for sensing phase and amplitude of pulses entering said inlet and leaving said outlet.

* * * * *